United States Patent [19]
Randle et al.

[11] 3,900,403
[45] Aug. 19, 1975

[54] FILTRATION APPARATUS

[75] Inventors: Raymond Thomas Randle, Hartlepool; John Williamson, Hart, near Hartlepool; David Wilson, Hartlepool, all of England

[73] Assignee: Steetley (Mfg.) Limited, Worksop, England

[22] Filed: Mar. 25, 1974

[21] Appl. No.: 454,276

[30] Foreign Application Priority Data
Mar. 29, 1973 United Kingdom............... 15223/73
Oct. 26, 1973 United Kingdom............... 50000/73

[52] U.S. Cl................. 210/350; 210/408; 100/211
[51] Int. Cl.²........................................ B01D 29/42
[58] Field of Search........... 210/66, 350, 408, 351; 100/211

[56] References Cited
UNITED STATES PATENTS
| | | | |
|---|---|---|---|
| 3,550,775 | 3/1968 | Cooley | 210/408 X |
| 3,707,230 | 12/1972 | Davidson | 210/19 X |
| 3,753,499 | 8/1973 | Gwilliam | 210/350 |

Primary Examiner—Frank A. Spear, Jr.
Assistant Examiner—Ferris H. Lander
Attorney, Agent, or Firm—Bacon & Thomas

[57] ABSTRACT

A filtration apparatus for separating liquid and solid components from mixtures thereof comprises a cylindrical housing accommodating therein a stationary hollow perforated cylindrical body fixedly secured thereto, an impermeable elastic sleeve disposed within the annular space defined by the inside of the housing and the outside of the cylindrical body thereby dividing the annular space into an inner filtration compartment and an outer pressure applying compartment, a filter element disposed around and supported by the cylindrical body, outlet means for the discharge of filtrate which has passed through the filter element into the cylindrical body, an inlet into the inner compartment for liquid/solid mixtures, an inlet into the outer compartment for a hydraulic fluid under pressure and a pivoted end plate constructed and arranged to permit discharge of filter cake from the inner compartment.

10 Claims, 5 Drawing Figures

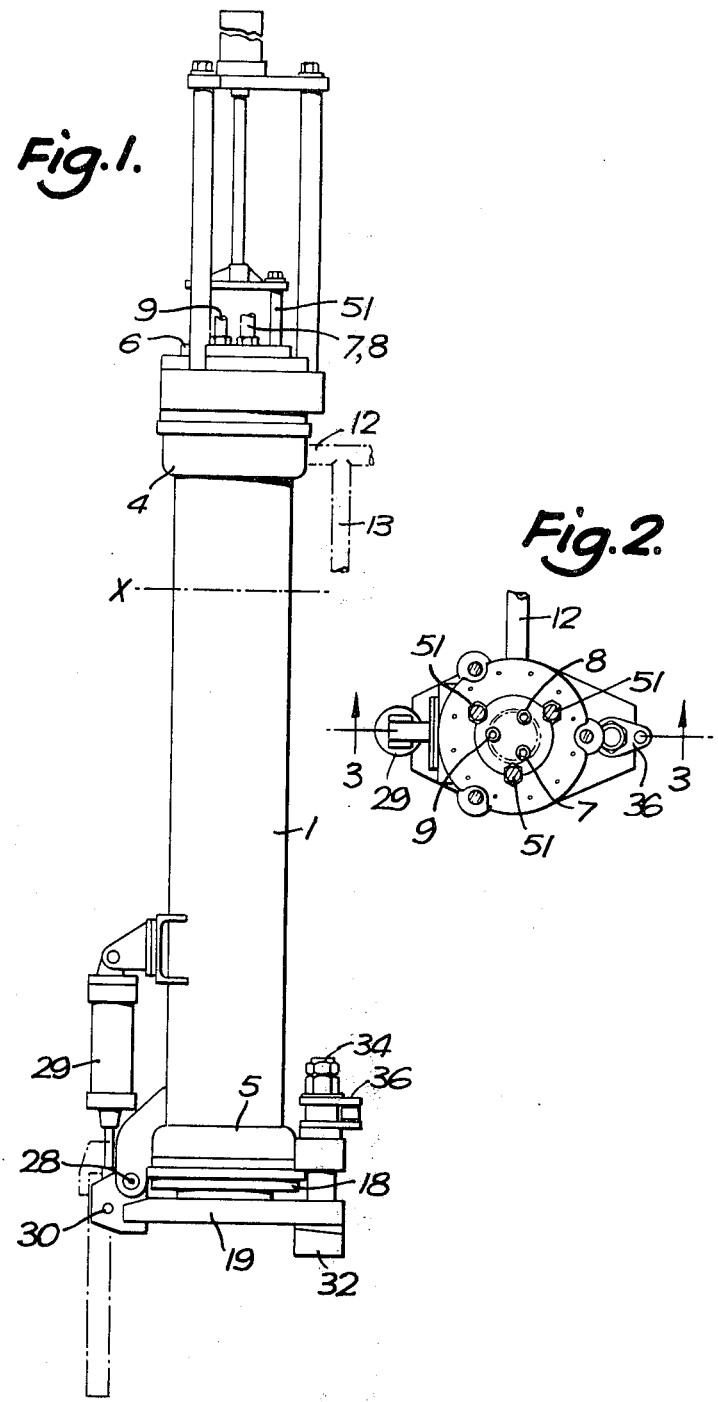

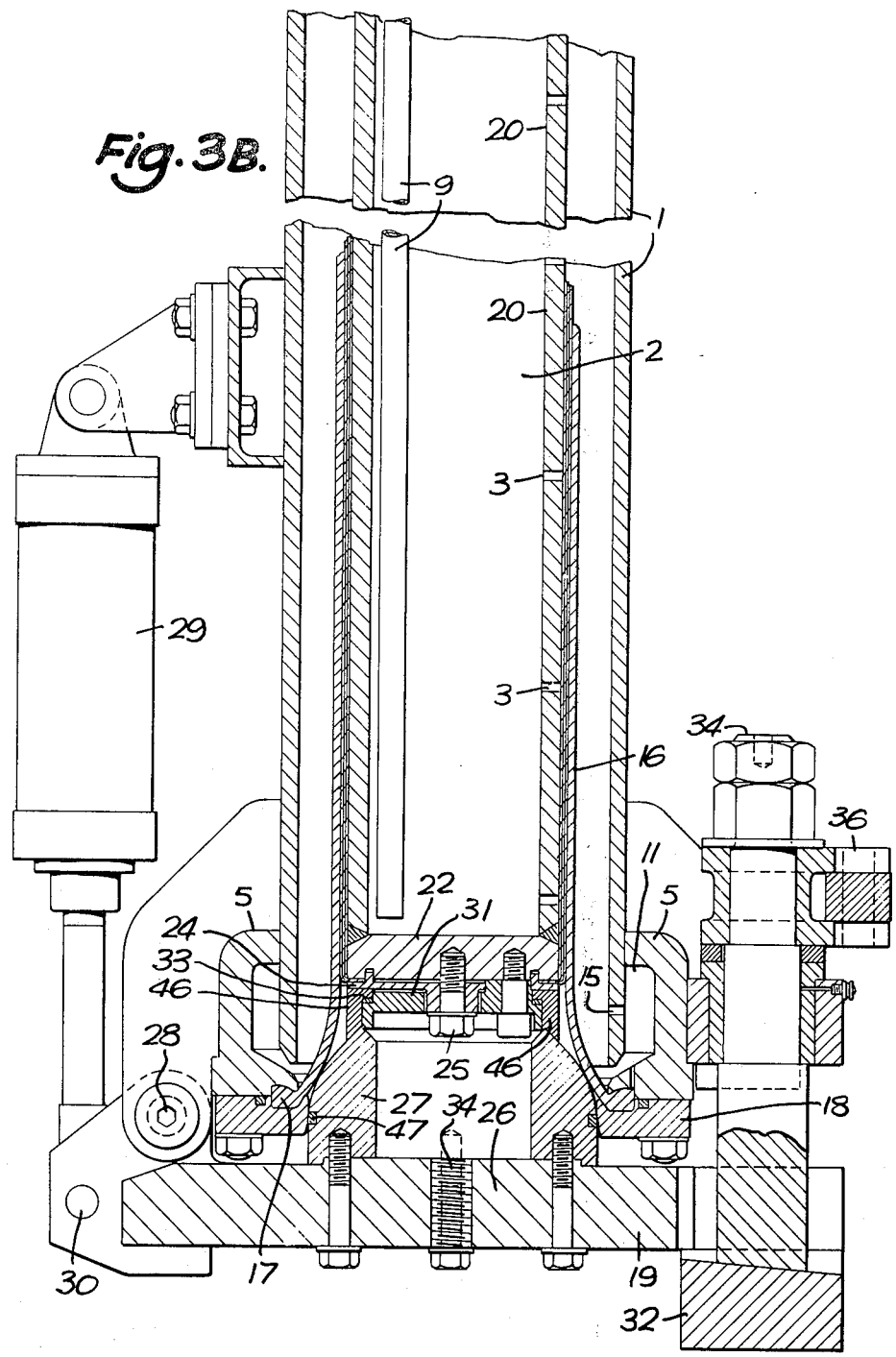

FILTRATION APPARATUS

The present invention relates to a filtration apparatus for the separation of liquid and solid components from mixtures thereof.

In particular the present invention relates to a filtration apparatus of the type wherein the material to be filtered is fed to the space between a cylindrical filter and a concentric flexible bladder, the bladder being capable of being pressed by a hydraulic fluid against the material to be filtered thus forcing the liquid component through the filter.

According to the present invention there is provided a filtration apparatus which comprises a cylindrical housing accommodating a hollow perforated cylindrical body, an impermeable elastic sleeve disposed within the annular space defined by the inside of the housing and the outside of the cylindrical body and preferably circumferentially attached at its ends to the housing of the cylindrical body, thereby dividing the annular space into an inner filtration compartment and an outer pressure applying compartment, a filter element disposed around and supported by the cylindrical body, outlet means for the discharge of filtrate which has passed through the filter element into the cylindrical body, an inlet into the inner compartment for liquid/solid mixtures, an inlet into the outer compartment for a hydraulic fluid under pressure, a pivoted end plate constructed and arranged to permit discharge of filter cake from the inner compartment and preferably an inlet into the interior of the cylindrical body for compressed air.

Preferably the bottom of the housing overlaps the cylindrical body and the pivoted end plate is provided with a convex portion which is adapted, in the closed position of the plate, to seal against the body and against the overlapping housing and to provide a surface which between the seals substantially conforms to the surface of the elastic sleeve.

The cylindrical body may incorporate means to vibrate the body during cake discharge. A suitable means is a torsional mode transducer.

The cylindrical body may also be tapered in such a way as to assist cake discharge. In these circumstances, the impermeable elastic sleeve may be increased in thickness to compensate for the decrease in diameter of the cylindrical body.

The inlet i.e., the slurry feed line to the inner compartment may be provided with a suitable valve, for instance, a manifold, the outlets to which would normally be sealed by a resilient sleeve. Suitably the resilient sleeve is provided with rigid inserts at least in the vicinity of the outlets to the manifold. The slurry feed line may also incorporate a further valve with the purpose of isolating the filter unit from the pump for the slurry.

Preferably the inlet into the inner compartment for liquid/solid mixtures comprises a substantially cylindrical chamber provided with radially located apertures adapted to connect with the inner compartment, said chamber being located at one end of, and rectilinear with, the cylindrical body, an inlet line or lines into said chamber and a hollow cylindrical member so constructed and arranged as to move retractably to cover or expose said apertures. Preferably the cylindrical member is provided with apertures which, in one position of the member, coincide with the apertures in the chamber. Desirably the hollow cylindrical member is also constructed and arranged as to bear upon any filter cake adhering to the filter element and thereby dislodge or displace it. A significant advantage of this arrangement is that it allows the passage of slurries containing abrasive materials which may be of a particle size up to 10 mesh BSS.

Desirably the slurry feed line incorporates provision for an air/vacuum line.

There is also provided according to the present invention a method of filtering liquid/solid mixtures, particularly slurries of magnesium hydroxide, which method comprises feeding said mixture to a compartment partly defined by the filter-covered outside wall of a hollow perforated cylindrical body and partly defined by the inner face of an impermeable elastic sleeve, subsequently pumping hydraulic fluid to a compartment partly defined by the inside wall of a cylindrical housing which accommodates said cylindrical body and partly defined by the outer face of said impermeable elastic sleeve thereby to cause said elastic sleeve to compress the mixture and force liquid through the filter into the interior of said cylindrical body, removing liquid from the interior of the filter body, folding back a pivotable end plate of the cylindrical housing and forcing air under pressure into the interior of said body thereby to cause the filter cake disposed on said body to dislodge and fall under gravity through the aperture left by the folding back of the pivotable end plate.

The filtration apparatus of the present invention as used in the above process facilitates the filtration of slurries containing abrasive materials such as iron oxide and of slurries containing coarse materials such as chrome ore or additives which, in the case of magnesium hydroxide slurries include fibrous binders such as steel wool, wood, fibrous refractory material and the like.

The present invention will now be more particularly described and illustrated, by way of example, with reference to the accompanying drawings in which:

FIG. 1 is a side elevation of a filtration apparatus according to the present invention;

FIG. 2 is a plan view of the apparatus shown in FIG. 1;

FIG. 3B is a central vertical cross section of the apparatus on the line 3—3 of FIG. 2, below the division line X indicated in FIG. 1.

Figure 3A:
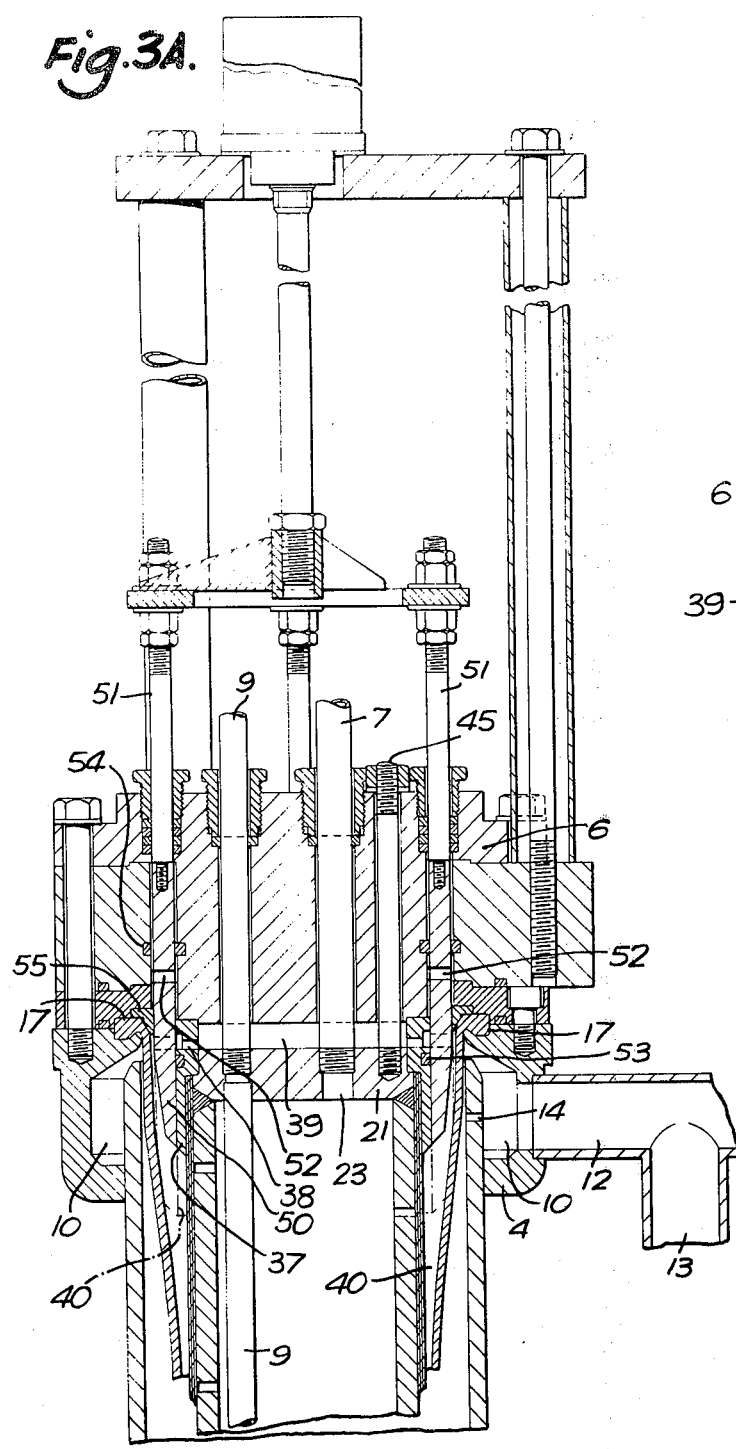
FIG. 3A is a central vertical cross section of the apparatus on the line 3—3 of FIG. 2, above the division line X indicated in FIG. 1.

Referring to the drawings, in particular to FIGS. 3A and 3B, a filtration apparatus is depicted having a tubular case 1 and disposed therein a tubular filtration unit generally indicated as 2. Welded to the tubular case are hollow flange members 4 and 5.

Figure 4:
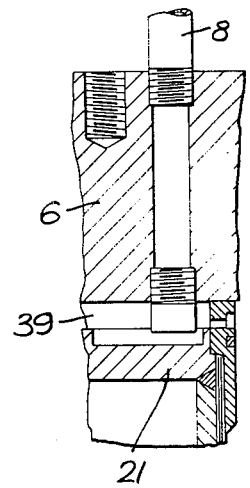
FIG. 4 is a part vertical section through the liquid/solid mixture inlet line of the apparatus as shown in FIG. 3A.

A composite end plate 6 is bolted to flange member 4. The end plate 6 is provided with an inlet line 7 for compressed air, an inlet line 8 (see FIGS. 2 and 4) for material to be filtered such as slurry and an outlet line 9 for filtrate, this line extending almost the full length of unit 2.

An annular member 18 is bolted to flange member 5, the aperture in annular member 18 being sealable by pivoted member generally indicated at 19.

Flanged members 4 and 5 are so shaped as to form manifold chambers 10 and 11 which are connected to a source of hydraulic fluid via conduits 12 and 13 and to the inside of tubular case 1 via ducts such as 14 and 15.

A flexible rubber sleeve 16 is nipped and sealed in channels 17 provided in flange members 4 and 5 and in end plate 6 and annular member 18.

The filtration unit 2 comprises a cylindrical metal tube 20 provided with a plurality of apertures 3 and sealed by an upper end plate 21 and a lower end plate 22. Upper end plate 21 has an aperture 23 connected to compressed air inlet 7. A bottom plate consists of two discs 24 and 31 bolted together and to lower end plate 22 by bolts 25, these bolts permitting the distance between plate 22 and plate 24 to be adjusted. A peripheral ledge 33 permits the nipping of a sealing ring 46 between discs 24 and 31. The metal tube 20 may have an inverted frustoconical shape, the cone angle being in the range 1°–10°. A suitable filter cloth and filter cloth support are positioned around metal tube 20.

Filtration unit 2 is secured by bolts 45 which fasten upper end plate 21 to end plate 6.

Disposed between end plate 6 and upper end plate 21 and bounded by annular fairing 37 is a chamber 39 with which line 8 connects and through which line 9 and the air line 7 pass. The fairing 37 is provided with ducts 38 which are sealable by a tapered cylindrical member 50. Member 50 is connected to a pneumatic jack by connecting rods 51 and is provided with apertures 52.

Sealing rings are provided at 53 between cylindrical member 50 and fairing 37, at 54 between plate 6 and cylindrical member 50 and at 55 between sleeve 16 and cylindrical member 50.

Hinged member 19 comprises a circular plate 26 bolted to an annular member 27 having a convex exterior which forms a hollow bulbous sealing member which is adapted to close the aperture in annular member 18. Plate 26 is provided with an aperture 34 thereby relieving any pressure which might develop on the central area of plate 26. A ring of compressible material located in channel 47 and sealing ring 46 are provided to ensure tight sealing. The sealing in respect of ring 46 is adjustable by means of plate 24 which can be moved by means of bolts 25.

It will be appreciated that the exterior shape of member 27 enables it to support sleeve 16 thereby preventing distortion of the sleeve when this is under pressure from the hydraulic fluid. Moreover when sleeve 16 is pressed against member 27 this relieves the pressure on the seal at 47.

Circular plate 26 is adapted to rotate about pivot 28 rotation being effected by a hydraulic ram 29 operating on pivot 30 attached to an extension of plate 26.

Hinged member 19 is releasably locked in position by a locking member which consists of a bevelled rotatable catch 32. Catch 32 rotates on an axis 34 and is operated in a self-evident manner by a hydraulic ram 36.

In operation cylindrical member 50 is moved by the pneumatic jack until apertures 52 coincide with ducts 38 and then material to be filtered e.g., slurry, is pumped into compartment 40 via inlet 8, chamber 39, duct 38, and aperture 52. When compartment 40 is full, the supply of slurry is stopped by raising cylindrical member 50 by means of the pneumatic jack thus sealing duct 38. Any slurry remaining in chamber 39 is sucked out through slurry feed tube 8. There is no requirement in this design of filter for an initial feed, prior to feeding the slurry, of a small quantity of hydraulic fluid in order to seal the sleeve against the filter structure and therefore the full volume of compartment 40 is available for slurry.

In order to filter the slurry, hydraulic fluid is pumped via lines 12 and 13, chambers 10 and 11 and annular ducts 14 and 15 into the space between the interior of tubular case 1 and the exterior of rubber sleeve 16 thereby to press the rubber sleeve against the slurry contained in compartment 40 and force the liquid component of the slurry through the filter cloth and ducts 3 into the interior of filter unit 2. Filtrate is forced from the filter unit 2 through outlet 9 by air fed into the air line 7 at about 5 psi.

Upon completion of the filtering operation the hydraulic fluid is removed from the filtration apparatus and the cake remaining on the filter cloth is removed. Removal of the cake is achieved by opening pivoted member 19 and injecting two pulsed blasts of air at about 100 psi through the air line 7, this air pressure being transmitted through apertures 3 to dislodge the filter cloth and dislodge the cake. The cake at the upper end of the filter cloth is not readily removed by air pressure and this is therefore removed by moving down cylindrical member 50 to push the cake still adhering off the filter cloth.

Since the filter cake can fall freely off tube 20 and through the bottom aperture, filter cake removal is particularly easy in that it is not necessary for the cylindrical filter cake to break either laterally or transversely before it can be removed.

Pivoted member 19 is opened by operation of hydraulic rams 29 and 36, ram 36 serving to release catch 32 and ram 29 serving to swing cup 27 away from its seat on annular member 18.

Upper end plate 21 may comprise or be replaced by a torsional mode transducer thereby enabling metal tube 20 to be vibrated during cake discharge. A suitable transducer is descibed in "Sonics" by Hueter and Bott published by Wiley pp 312. The transducer may be used to give a series of spaced pulses of vibration. The vibrations may be torsional or radial or a combination of both.

In a modification of the above apparatus of the invention, improved operation may be obtained by incorporating into slurry feed line 8 a line to which, by a suitable system of valves, either vacuum or compressed air can be applied, vacuum being applied sometime during the dewatering stage to clear any surplus slurry in the line 8 and then compressed air being applied to free cake from rubber sleeve 16 and to assist any vacuum cycle which is applied to hydraulic fluid feed lines 12 and 13. Compressed air fed through the cake will also assist any vacuum cycle which is applied to lines 12 and 13 and will additionally partially dewater the filter cake.

With advantage a valve can be incorporated in slurry line 8 to assist in preventing slurry being pushed back during filtration and to reduce cycle time by allowing the slurry pump to be kept running.

We claim:

1. A filtration apparatus which comprises a cylindrical housing accommodating therein a stationary, hollow, perforated, cylindrical body fixedly secured thereto and thus creating an annular space defined by the inside of the housing and the outside of the cylindrical body, an impermeable elastic sleeve disposed within said annular space and fixed at its opposite ends to said housing thereby dividing the annular space into an inner filtration compartment and an outer pressure applying compartment, a filter element disposed around and supported by the cylindrical body, outlet means connected with the interior of said cylindrical body for the discharge of filtrate which has passed through the filter element into the cylindrical body, an inlet into the inner filtration compartment for liquid/solid mixtures, an inlet into the outer pressure applying compartment for a hydraulic fluid under pressure, said housing having an annular opening at its lower end below the lower end of said cylindrical body, means for dislodging filter cake from said filter element, and a pivoted end plate hinged to said housing for closing said annular opening, said end plate, when in the open position, constructed and arranged to permit discharge from the inner filtration compartment of filter cake dislodged from said filter element.

2. An apparatus as claimed in claim 1 additionally comprising an inlet into the interior of the cylindrical body for compressed air.

3. An apparatus as claimed in claim 1 wherein the bottom of the housing overlaps the cylindrical body and the pivoted end plate is provided with a convex portion which is adapted, in the closed position of the plate, to seal against the body and against the overlapping housing and to provide a surface which between the seals substantially conforms to the surface of the elastic sleeve.

4. An apparatus as claimed in claim 1 wherein the cylindrical body incorporates means to vibrate the body during cake discharge.

5. An apparatus as claimed in claim 4 wherein the means to vibrate the cylindrical body during cake discharge is a torsional mode transducer.

6. An apparatus as claimed in claim 1 wherein the cylindrical body is tapered upwardly and outwardly from its lower end to assist in cake discharge.

7. An apparatus as claimed in claim 1 wherein the inlet into the inner filtration compartment for liquid/solid mixtures comprises a substantially cylindrical chamber provided with radially located apertures adapted to connect the interior of said chamber with the interior of said inner filtration compartment, said chamber being located at the upper end of, and rectilinear with, the cylindrical body, at least one inlet line for conducting liquid/solid mixture into said chamber, and a hollow cylindrical member disposed around the side wall of said chamber so constructed and arranged as to move rectilinearly with respect to said chamber to cover or expose said apertures.

8. An apparatus as claimed in claim 7 wherein the cylindrical member is provided with apertures which, in one position of the member, coincide with the apertures in the chamber.

9. An apparatus as claimed in claim 7 wherein the hollow cylindrical member is movable rectilinearly to a position disposed around the upper end of said filter element and is constructed and arranged as to engage filter cake adhering to the upper end of the filter element and thereby dislodge or displace any such adhering filter cake.

10. An apparatus as claimed in claim 1 wherein:
  i. the inlet into the inner filtration compartment for liquid/solid mixtures comprises a substantially cylindrical chamber provided with radially located apertures connected with the inner filtration compartment, said chamber being located at one end of, and rectilinear with, the cylindrical body, at least one inlet line for conducting liquid/slurry mixture into said chamber, and a hollow cylindrical member disposed around the side wall of said chamber and so constructed and arranged as to move rectilinearly to cover or expose said apertures, said member being provided with apertures, which, in one position of the member, coincide with the apertures in the chamber; and
  ii. the bottom wall of the housing overlaps the cylindrical body and the pivoted end plate is provided with a convex portion which is adapted, in the closed position of the plate, to seal against the body and against the overlapping housing and to provide a surface which between the seals substantially conforms to the adjacent surface of the elastic sleeve.

* * * * *